(12) United States Patent
Maeda et al.

(10) Patent No.: US 9,868,298 B2
(45) Date of Patent: *Jan. 16, 2018

(54) IMAGE-FORMING METHOD

(71) Applicant: Konica Minolta, Inc., Tokyo (JP)

(72) Inventors: Akio Maeda, Tokyo (JP); Toshiyuki Takabayashi, Tokyo (JP); Takashi Iwata, Tokyo (JP); Hirotaka Iijima, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 688 days.

This patent is subject to a terminal disclaimer.

(21) Appl. No.: 14/390,222

(22) PCT Filed: Apr. 5, 2013

(86) PCT No.: PCT/JP2013/002362
§ 371 (c)(1),
(2) Date: Oct. 2, 2014

(87) PCT Pub. No.: WO2013/150802
PCT Pub. Date: Oct. 10, 2013

(65) Prior Publication Data
US 2015/0062267 A1 Mar. 5, 2015

(30) Foreign Application Priority Data

Apr. 5, 2012 (JP) .................................. 2012-086485

(51) Int. Cl.
*B41J 2/21* (2006.01)
*B41J 11/00* (2006.01)
(Continued)

(52) U.S. Cl.
CPC ........... *B41J 11/002* (2013.01); *C09D 11/101* (2013.01); *C09D 11/12* (2013.01); *C09D 11/322* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 8,124,791 B2 * 2/2012 Shinjo .................. C08F 222/40
548/520
2003/0092820 A1 5/2003 Schmidt et al.
(Continued)

FOREIGN PATENT DOCUMENTS

JP 2005-504860 A 2/2005
JP 2011-012256 A 1/2011
(Continued)

*Primary Examiner* — Manish S Shah
(74) *Attorney, Agent, or Firm* — Lucas & Mercanti, LLP

(57) ABSTRACT

An inkjet recording method comprising: shooting to a recording medium an active-light-ray-curable inkjet ink including a photopolymerizable compound, a wax, a photopolymerization initiator, and a coloring material, and that undergoes reversible sol-gel phase transition relative to temperature; and curing the ink by irradiating an active light ray to the ink that has been shot to the recording medium, wherein the ink including a (meta) acrylate compound (B) having a molecular weight of 300-1500 and a ClogP value within the range 4.0 to 7.0, the wax content being 1.0-10 percent by mass of the total mass of the ink, and the temperature of the recording medium at active light ray irradiation being set such that the saturation solubility of the (Continued)

wax with respect to the ink constitutes 0.5 percent by mass or less. According to this image-forming method, blooming is suppressed.

8 Claims, 3 Drawing Sheets

(51) Int. Cl.
| | | |
|---|---|---|
| *C09D 11/101* | (2014.01) | |
| *C09D 11/322* | (2014.01) | |
| *C09D 11/38* | (2014.01) | |
| *C09D 11/12* | (2006.01) | |
| *C09D 11/34* | (2014.01) | |
| *B41M 5/00* | (2006.01) | |
| *B41M 7/00* | (2006.01) | |

(52) U.S. Cl.
CPC .............. *C09D 11/34* (2013.01); *C09D 11/38* (2013.01); *B41M 5/0023* (2013.01); *B41M 7/0081* (2013.01)

(58) Field of Classification Search
CPC ...... B41J 2/1755; B41J 2/2114; B41J 2/2117; B41J 11/0015; B41J 11/002; B41J 2/2056; B41J 2/21; B41J 2/0057; B41J 3/60; B41J 2002/012; B41J 2/04598; B41J 2/04586; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
See application file for complete search history.

(56) References Cited

U.S. PATENT DOCUMENTS

| | | |
|---|---|---|
| 2005/0080163 A1 | 4/2005 | Schmidt et al. |
| 2009/0046134 A1 | 2/2009 | Belelie et al. |
| 2010/0239777 A1* | 9/2010 | Nakajima ............ C09D 11/101 427/508 |
| 2011/0141187 A1* | 6/2011 | Takabayashi ........ B41M 5/0023 347/20 |
| 2012/0327157 A1 | 12/2012 | Iijima et al. |
| 2013/0307913 A1* | 11/2013 | Kawashima ............. B41J 2/155 347/100 |

FOREIGN PATENT DOCUMENTS

| | | |
|---|---|---|
| JP | 2012-040760 A | 3/2012 |
| JP | 2012-041441 A | 3/2012 |
| WO | WO 2011/111733 A1 | 9/2011 |

* cited by examiner

IMAGE-FORMING METHOD

CROSS REFERENCE TO RELATED APPLICATION

This Application is a 371 of PCT/JP2013/002362 filed on Apr. 5, 2013 which, in turn, claimed the priority of Japanese Patent Application No. JP2012-086485 filed on Apr. 5, 2012, both applications are incorporated herein by reference.

TECHNICAL FIELD

The present invention relates to an image forming method using an actinic radiation-curable inkjet ink.

BACKGROUND ART

Inkjet recording methods enable simple and inexpensive image production and therefore have been used in a variety of printing fields. Among the inkjet recording methods, a UV-curable inkjet method is known in which droplets of UV-curable inkjet ink are landed to a recording medium and then cured by radiation with ultraviolet rays to form an image. Recently, the UV-curable inkjet method has been attracting attention for its capability of forming images having high rubfastness and adhesiveness even on recording media which lack ink absorbing properties.

However, image forming methods using the UV-curable inkjet systems have the drawback of poor image quality due to failure to prevent combining of neighboring dots, during high-speed recording such as single pass recoding using a line recording head or high speed serial recording. One method of preventing combining of neighboring dots is to add a gelling agent to an UV-curable inkjet ink (see, e.g., PTLS 1 and 2).

CITATION LIST

Patent Literature

PTL 1
Japanese Translation of PCT Application Laid-Open No. 2005-504860
PTL 2
US 2009/0046134

SUMMARY OF INVENTION

Technical Problem

In these techniques ink undergoes gelation after landing, resulting in improved pinning properties. If the ink contains a wax as a gelling agent, however, the wax tends to precipitate on the surface of a printed matter and thus the appearance becomes poor. Hereinafter the term "pinning" refers to primary-fixation of solution on recording medium for fixing the position of edges. As used herein, term "pinning properties" refers to the ink's ability of being primarily-fixed.

The present invention has been made in view of the circumstances described above. It is an object of the present invention to provide an image forming method that involves the use of an actinic radiation-curable inkjet ink having high pinning properties with less degradation of appearance after curing. It is another object of the present invention to provide an image forming method that involves the use of an actinic radiation-curable inkjet ink, which method enables stable formation of high-quality images with high bending resistance and rubfastness.

Solution to Problem

[1] A first aspect of the present invention relates to an image forming method with use of an actinic radiation-curable inkjet ink given below.

An image forming method being an inkjet recording method including: ejecting to a recording medium an actinic radiation-curable inkjet ink including a photopolymerizable compound, a wax, a photopolymerization initiator, and a colorant, the actinic radiation-curable inkjet ink configured to undergo temperature-induced reversible sol-gel phase transition; and curing the ink ejected to the recording medium with actinic radiation; wherein the photopolymerizable compound includes a (meth)acrylate compound B having a molecular weight in a range from 300 to 1,500 and having a ClogP value in a range from 4.0 to 7.0; the wax is contained in an amount of 1.0 to 10 wt % relative to a total weight of the ink; and a temperature of the recording medium during application of the actinic radiation is set at a temperature such that the wax has a saturation solubility in the ink of 0.5 wt % or less.

[2] An image forming method being inkjet recording method including: ejecting to a recording medium an actinic radiation-curable inkjet ink including a photopolymerizable compound, a wax, a photopolymerization initiator, and a colorant, the actinic radiation-curable inkjet ink configured to undergo temperature-induced reversible sol-gel phase transition; and curing the ink ejected to the recording medium with actinic radiation; wherein the photopolymerizable compound includes a (meth)acrylate compound A having a molecular weight in a range from 300 to 1,500 and having 3 or more and less than 14 structural units represented by ($-CH_2-CH_2-O-$) in the molecule and a (meth)acrylate compound B having a molecular weight in a range from 300 to 1,500 and having a ClogP value in a range from 4.0 to 7.0; the (meth)acrylate compound A in an amount of 30 to 70 wt %, the (meth)acrylate compound B in an amount of 10 to 40 wt %, and the wax in an amount of 1.0 to 10 wt % is contained relative to the whole amount of the ink; and a temperature of the recording medium during application of the actinic radiation is set at a temperature such that the wax has a saturation solubility in the ink of 0.5 wt % or less.

[3] The image forming method according to [1] or [2], in which the (meth)acrylate compound B is at least one compound of the following (1) and (2):
(1) a trifunctional or higher-functional (meth)acrylate compound having 3 or more and less than 14 structural units represented by ($-C(CH_3)H-CH_2-O-$) in a molecule thereof, and
(2) a bifunctional or higher-functional (meth)acrylate compound having a cyclic structure in a molecule thereof.

[4] The image forming method according to [1] or [2], in which the temperature of the recording medium during application of the actinic radiation is set at a temperature such that the wax has a saturation solubility in the ink of 0.1 wt % or less.

[5] The image forming method according to [1] or [2], in which the actinic radiation-curable inkjet ink contains the wax in an amount of 1.5 wt % or more and less than 7 wt %.

[6] The image forming method according to [1] or [2], in which the wax has a melting point of 30° C. or higher and lower than 150° C.

[7] The image forming method according to [1] or [2], in which the wax is at least one selected from the group consisting of an aliphatic ketone, an aliphatic monoester, a higher fatty acid, a higher alcohol, and an amide wax.

[8] The image forming method according to [1] or [2], in which the wax has a ClogP value of 10 or higher.

Advantageous Effects of Invention

According to the image forming method of the present invention, even though an image is formed with use of a wax-containing actinic radiation-curable inkjet ink, high pinning properties can be achieved and degradation of appearance can be prevented. In other words, the image forming method of the present invention can prevent the occurrence of a so-called "blooming" phenomenon due to precipitation of wax on the image surface. Furthermore, the image recording with use of the actinic radiation-curable ink of the present invention allows for stable formation of high quality images with high bending resistance and rubfastness.

DESCRIPTION OF EMBODIMENTS

Figure 1:
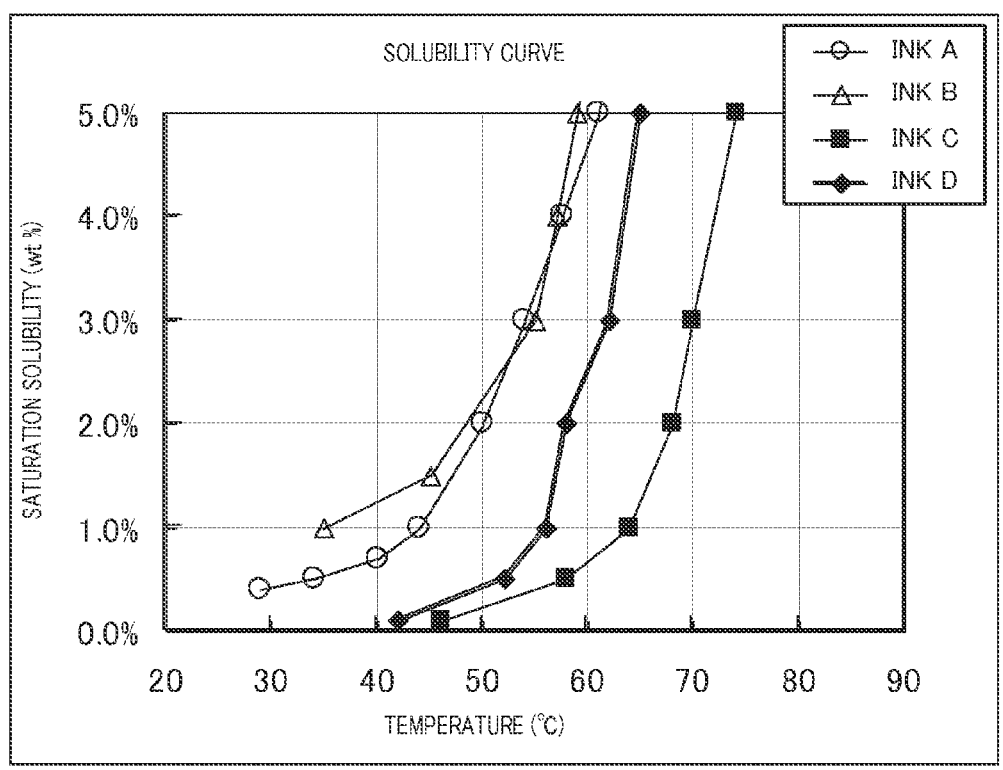
FIG. 1 is a graph illustrating an example of a saturation solubility curve of a wax in an actinic radiation-curable inkjet ink.

Hereinafter, the present invention is described with reference to embodiments, which however shall not be construed as limiting the scope of the present invention. With the image forming method according to an embodiment, an image is formed by applying a specific actinic radiation-curable ink. The actinic radiation-curable ink for use in the image forming method according to an embodiment is firstly described.

<Actinic Radiation-Curable Ink>

The actinic radiation-curable ink to be applied in the image forming method according to an embodiment includes a photopolymerizable compound, a wax, a photopolymerization initiator, and a colorant.

[Photopolymerizable Compound]

The photopolymerizable compound is defined as a compound which undergoes crosslinking or polymerization by irradiattion with actinic radiation. Examples of actinic radiation include electron beams, ultraviolet rays, α rays, γ rays, and X rays. Ultraviolet rays are preferable. The photopolymerizable compound may be a radical polymerizable compound or a cationic polymerizable compound, among which a radical polymerizable compound is preferably used.

The radical polymerizable compound is defined as a compound (monomer, oligomer, polymer or mixture thereof) which has a radically polymerizable ethylenically unsaturated bond. The radical polymerizable compound may be used either singly or in combination of two or more types.

Examples of the compound having a radically polymerizable ethylenically unsaturated bond include an unsaturated carboxylic acid and a salt thereof, an unsaturated carboxylic ester compound, an unsaturated carboxylic urethane compound, an unsaturated carboxylic amide compound and an anhydride thereof, acrylonitrile, styrene, unsaturated polyester, unsaturated polyether, unsaturated polyamide, and unsaturated urethane. Examples of the unsaturated carboxylic acid include (meth)acrylic acid, itaconic acid, crotonic acid, isocrotonic acid, and maleic acid.

Among the foregoing, the radical polymerizable compound is preferably an unsaturated carboxylic ester compound and more preferably a (meth)acrylate compound. As well as a monomer, the (meth)acrylate compound may be an oligomer, a mixture of a monomer and an oligomer, a modified product, or an oligomer having a polymerizable functional group. The term "(meth)acrylate" refers to both or one of "acrylate" and "methacrylate" and the term "(meth) acryl" refers to both or one of "acryl" and "methacryl".

The photopolymerizable compound preferably includes a (meth)acrylate compound B having a ClogP value in a range from 4.0 to 7.0. The photopolymerizable compound preferably further includes a (meth)acrylate compound A having 3 or more and less than 14 structural units represented by ($-CH_2-CH_2-O-$) in the molecule.

[(Meth)Acrylate Compound A]

The (meth)acrylate compound A includes 3 or more and less than 14 structural units represented by ($-CH_2-CH_2-O-$) in the molecule. More preferably, the (meth)acrylate compound includes 4 or more and less than 10 structural units represented by ($-CH_2-CH_2-O-$). When the (meth)acrylate compound includes 3 or more structural units represented by ($-CH_2-CH_2-O-$), the cured product of an actinic radiation-curable inkjet ink can have increased flexibility. If the (meth)acrylate compound includes 14 or more structural units represented by ($-CH_2-CH_2-O-$) in the molecule, the (meth)acrylate compound A has excessively high hydrophilicity, so that the wax is not sufficiently dissolved in the actinic radiation-curable inkjet ink.

The (meth)acrylate compound A has a ClogP value of preferably less than 4.0, more preferably 0.1 or more and less than 4.0. If ClogP value of the (meth)acrylate compound A is excessively low, the hydrophilicity of the ink is increased, so that the compatibility of the (meth)acrylate compound A with the wax is lowered and the ink is therefore destabilized.

The (meth)acrylate compound A has a molecular weight in a range from 300 to 1,500, preferably in a range from 300 to 800. When the molecular weight of is 300 or more, the ink ejection stability is improved since less volatilization occurs in the application apparatus. If the molecular weight is more than 1,500, ink viscosity is excessively increased during application of the ink.

The (meth)acrylate compound A is (meth)acrylic acid ester and has a repeating unit ($-CH_2-CH_2-O-$) of ethylene glycol in the ester moiety. The (meth)acrylate compound A preferably has two or more (meth)acrylic groups. Specifically, the photopolymerizable compound A preferably has two, three, or four (meth)acrylic groups.

Specific examples of the (meth)acrylate compound A include 4EO modified hexanediol diacrylate (CD561, manufactured by Sartomer Company, Inc., molecular weight: 358), 3EO modified trimethylolpropane triacrylate (SR454, manufactured by Sartomer Company, Inc., molecular weight: 429), 4EO modified pentaerythritol tetraacrylate (SR494, manufactured by Sartomer Company, Inc., molecular weight: 528), 6EO modified trimethylolpropane triacrylate (SR499, manufactured by Sartomer Company, Inc., molecular weight: 560), polyethylene glycol diacrylate (NK ESTER A-400, manufactured by Shin-Nakamura Chemical Co., Ltd., molecular weight: 508), (NK ESTER A-600, manufactured by Shin-Nakamura Chemical Co., Ltd., molecular weight: 708), polyethylene glycol dimethacrylate (NK ESTER 9G, manufactured by Shin-Nakamura Chemical Co., Ltd., molecular weight: 536), and tetraethylene glycol diacrylate (V#335HP, manufactured by Osaka Organic Chemical Industry Ltd., molecular weight: 302,).

The amount of the (meth)acrylate compound A relative to the total weight of an actinic radiation-curable inkjet ink is 30 to 70 wt %, more preferably 35 to 60 wt %. If the amount of the (meth)acrylate compound A is more than 70 wt %, the ink has increased hydrophilicity with reduced solubility of wax, and the stability of gelation is impaired. If the amount of the (meth)acrylate compound A is less than 30 wt %, the cured product of the ink has reduced flexibility, which may cause an image film to be torn when the image is bent.

[(Meth)Acrylate Compound B]

The (meth)acrylate compound B has a molecular weight preferably in a range from 300 to 1,500, more preferably in a range from 300 to 800. With a molecular weight of 300 or more, the ink ejection stability is improved due to reduced volatilization in an application apparatus. If a molecular weight of the ink is more than 1,500, the viscosity is excessively increased during application of the ink.

Preferably the (meth)acrylate compound B is a compound having a molecular weight of 300 to 1,500 and a ClogP value of 4.0 to 7.0. More preferably the ClogP value is 4.5 to 6.0. If a ClogP value of the (meth)acrylate compound B is less than 4.0, the hydrophilicity of the actinic radiation-curable inkjet ink is increased, so that the wax is not easily dissolved and the wax may not be completely dissolved even when heated. Thus the wax is not stabilized.

If a ClogP value of the (meth)acrylate compound B is more than 7.0, the compatibility between the (meth)acrylate compound B and the wax becomes excessively high. In other words, the wax does not easily precipitate in the ink after landing, so that the ink does not undergo gelation sufficiently. The excessively high compatibility between the (meth)acrylate compound B and the wax causes a large amount of the wax to be dissolved in the ink after landing without crystallization. The uncrystallized wax tends to move to the surface of cured product. The wax is then crystallized at the surface of cured product so as to cause blooming.

As used herein, the term "Log P value" refers to a coefficient indicating the affinity of an organic compound to water and 1-octanol. The 1-octanol/water partition coefficient P is a partition equilibrium achieved when a trace amount of a compound is dissolved as a solute in a two-liquid phase solvent of 1-octanol and water, which equals the ratio of equilibrium concentrations of the compound in the respective solvents, and which is expressed as Log P, the logarithm to the base 10 of the partition coefficient. That is, the "Log value" is a logarithmic value of the partition coefficient of 1-octanol/water, and it is known as an important parameter indicating the hydrophilicity and hydrophobicity of a molecule.

"CLogP" is a Log P value found by calculation. The CLogP value can be calculated by the fragment method, atomic approach method, or the like. More specifically, in order to calculate the ClogP value, the fragment method described in literatures (C. Hansch and A. Leo, "Substituent Constants for Correlation Analysis in Chemistry and Biology" (John Wiley & Sons, New York, 1969)), or commercially available software package 1 or 2 described below may be used.

Software package 1: MedChem Software (Release 3.54, August 1991, Medicinal Chemistry Project, Pomona College, Claremont, Calif.)

Software package 2: ChemDraw Ultra Ver. 8.0. (April 2003, CambridgeSoft Corporation, USA)

The numerical value of the ClogP value as used herein is a "ClogP value" calculated using software package 2.

Preferred examples of the (meth)acrylate compound B include: (1) a trifunctional or higher functional methacrylate or acrylate compounds having 3 or more and less than 14, preferably 3 or more and less than 10 structural units represented by (—C(CH$_3$)H—CH$_2$—O—) in the molecule; and (2) a difunctional or higher functional methacrylate or acrylate compounds having a cyclic structure in the molecule. These (meth)acrylate compounds have high photocurability. In addition, the compounds have less shrinkage when cured and high repeating reproducibility of sol-gel phase transition.

Examples of (1) the trifunctional or higher functional methacrylate or acrylate compound, which has a structural unit represented by (—C(CH$_3$)H—CH$_2$—O—) in the molecule include a compound obtained by modifying a hydroxyl group of a compound having three or more hydroxyl groups with propylene oxide and esterifying the obtained modified product with (meth)acrylic acid. Specific examples of the compound include, although not limited thereto, 3PO modified trimethylolpropane triacrylate (Photomer 4072, molecular weight 471, ClogP 4.90, manufactured by Cognis) and 3PO modified trimethylolpropane triacrylate (Miramer M360, molecular weight 471, ClogP 4.90, manufactured by Miwon).

Examples of (2) the bifunctional or higher-functional methacrylate or acrylate compound having a cyclic structure in the molecule include a compound obtained by esterifying a hydroxyl group of a compound having two or more hydroxyl groups and a cyclic structure with (meth)acrylic acid. The cyclic structure is preferably a cycloalkane structure, more preferably a tricycloalkane structure. Specific examples of the compound include, but not limited to, the following compounds:

Tricyclodecane dimethanol diacrylate (NK ESTER A-DCP, molecular weight: 304, ClogP: 4.69, manufactured by Shin-Nakamura Chemical Co., Ltd.), and Tricyclodecane dimethanol dimethacrylate (NK ESTER DCP, molecular weight: 332, ClogP: 5.12, manufactured by Shin-Nakamura Chemical Co., Ltd.).

Another specific example of the (meth)acrylate compound B is 1,10-decanediol dimethacrylate (NK ESTER DOD-N, molecular weight: 310, ClogP: 5.75, manufactured by Shin-Nakamura Chemical Co., Ltd.).

The amount of the (meth)acrylate compound B relative to the total weight of the actinic radiation-curable inkjet ink is 10 to 40 wt %, preferably 20 to 35 wt %. If an amount of the (meth)acrylate compound B is less than 10 wt %, the hydrophilicity of the ink is increased, so that the solubility of wax is lowered and the stability of gelation is impaired. If the amount is more than 40 wt %, high shrinkage is yielded when the ink droplets are cured, and the printed matter is curled, and the image film may be torn when the image is bent.

The present inventors established that in order to satisfy all of (i) good curability, (ii) bending resistance, (iii) high quality image (no unevenness in image density), and (iv) secured discharge stability in the above-described wax-containing actinic radiation-curable inkjet ink, the use of (meth)acrylate compound B in the weight range described above is preferred, and the combined use of (meth)acrylate compound A in the weight range described above with (meth)acrylate compound B is more preferred. For conventional wax-containing UV-curable inks, compatibility between the wax and a polymerizable compound a solvent, has not been fully investigated; therefore, despite that dot combining can be prevented in the initial period of printing, when printing is continued, prevention of dot combining cannot be completely prevented in some cases. As a result, not all of the effects (i) to (iv) have not been achieved.

Although the reason why an ink including the (meth) acrylate compound A and the (meth)acrylate compound B exhibits all of the effects (i) to (iv) is uncertain, the following mechanism can be deduced. The actinic radiation-curable inkjet ink includes a highly homogeneous mixture of the (meth)acrylate compound A having a relatively high hydrophilicity and the (meth)acrylate compound B having a relatively high hydrophobicity. A wax, which has a hydrophilic part and a hydrophobic part, can therefore uniformly and stably exist in a polymerizable composition. As a result, the ink can be stably discharged. Furthermore, ink combining can be prevented due to rapid sol-gel phase transition.

The actinic radiation-curable inkjet ink may further include additional photopolymerizable compound(s) other than the (meth)acrylate compound A and the (meth)acrylate compound B. The additional photopolymerizable compound may be a (meth)acrylate monomer and/or oligomer, or other polymerizable oligomers.

Examples of the (meth)acrylate monomer and/or oligomer include monofunctional monomers such as isoamyl acrylate, stearyl acrylate, lauryl acrylate, octyl acrylate, decyl acrylate, isomyristyl acrylate, isostearyl acrylate, 2-ethylhexyl-diglycol acrylate, 2-hydroxybutyl acrylate, 2-acryloyloxyethylhexahydrophthalic acid, butoxyethyl acrylate, ethoxy diethylene glycol acrylate, methoxy diethylene glycol acrylate, methoxy polyethylene glycol acrylate, methoxy propylene glycol acrylate, phenoxy ethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethyl succinic acid, 2-acryloyloxyethyl phthalic acid, 2-acryloyloxyethyl-2-hydroxyethyl-phthalic acid, lactone-modified flexible acrylate, and t-butyl cyclohexyl acrylate; bifunctional monomers such as triethylene glycol diacrylate, tetraethylene glycol diacrylate, polyethylene glycol diacrylate, tripropylene glycol diacrylate, polypropylene glycol diacrylate, 1,4-butanediol diacrylate, 1,6-hexanediol diacrylate, 1,9-nonanediol diacrylate, neopentyl glycol diacrylate, dimethylol-tricyclodecane diacrylate, bisphenol A-PO adduct diacrylate, hydroxy pivalic acid neopentyl glycol diacrylate, and polytetramethylene glycol diacrylate; trifunctional or higher-functional monomers such as trimethylolpropane triacrylate, pentaerythritol triacrylate, pentaerythritol tetraacrylate, dipentaerythritol hexaacrylate, ditrimethylolpropane tetraacrylate, glycerin propoxy triacrylate, caprolactone-modified trimethylolpropane triacrylate, pentaerythritol ethoxy tetraacrylate, and caprolactam-modified dipentaerythritol hexaacrylate; and oligomers thereof.

Examples of the additional polymerizable oligomer include epoxy acrylate, aliphatic urethane acrylate, aromatic urethane acrylate, polyester acrylate, and straight-chain acrylic oligomer.

[Wax]

The term "wax" is generally defined as organic material which is solid at normal temperature and becomes liquid when heated. The melting point of the wax is preferably 30° C. or higher and lower than 150° C. The wax contained in an actinic radiation-curable inkjet ink preferably satisfies at least the following requirements: 1) the wax dissolves in a photopolymerizable compound at a temperature higher than a gelling temperature; 2) the wax is crystallized in the ink at a gelling temperature or lower; and 3) the wax has low saturation solubility in the ink at the temperature of a recording medium in the ink curing of the image forming method.

When the wax is crystallized in an ink, it is preferable that a space three-dimensionally surrounded by plate-like crystals, which is a crystallization product of the wax, is formed so that the photopolymerizable compound is included in the space described above. A structure in which a photopolymerizable compound is included in a space three-dimensionally surrounded by plate-like crystals can be referred to as a "card house structure." Once a card house structure is formed, the liquid photopolymerizable compound can be maintained while ink droplets are pinned. Consequently, combining of liquid droplets can be prevented. In order to form the card house structure, it is preferable that the photopolymerizable compound and the wax dissolving in the ink are compatible each other. In contrast, if the photopolymerizable compound and the wax dissolved in the ink is phase separated, occasionally a card house may not be formed.

The saturation solubility of a wax in an ink is the ratio of the saturation amount (weight) of the soluble wax to the total weight of the ink. The saturation solubility in the ink is preferably 0.5 wt % or less, more preferably 0.1 wt % or less, at the temperature of a recording medium in the curing step in the image forming method. If the saturation solubility is more than 0.5 wt % in the curing step, the amount of the wax dissolved in the ink increases during curing. The wax dissolved in the ink during curing, i.e. non-crystallized wax, precipitates by polymerization of the polymerizable compound in the curing step and moves slowly to the image surface. The wax moved to the image surface crystallizes to cause the blooming.

The saturation solubility of a wax in an ink can be determined by, for example, measurement of a wax-containing ink with a differential scanning calorimeter (DSC) in a temperature lowering process. More specifically, the determination is made based on the temperature at the center of the exothermic peak measured with a differential scanning calorimeter and the ratio of "amount of wax" to "total weight of ink". Alternatively, the saturation solubility of a wax in an ink may be determined by visual observation of the precipitation temperature of wax crystals in lowering the temperature of an ink in a test tube, or by visual observation of the precipitation temperature of wax crystals in spreading ink color on a medium under temperature control.

The ClogP value of the wax is preferably 10 or more, more preferably 12 or more. If a ClogP value of the wax is less than 10, the compatibility with the (meth)acrylate compound B becomes excessively high, and occasionally ink may not be crystallized after landing.

The type of wax is not specifically limited. Preferred examples of the wax include:

aliphatic ketone compounds such as dibehenyl ketone, distearyl ketone, dipalmityl ketone, dimyristyl ketone, dilauryl ketone, palmityl stearyl ketone, stearyl behenyl ketone, 18-Pentatriacontanon (e.g., reagent manufactured by Alfa Aeser), and ketone wax (e.g., KAOWAX T1 manufactured by Kao Corporation);

aliphatic monoester compounds such as behenyl behenate (e.g., UNISTER M-2222SL manufactured by NOF Corporation), stearyl stearate (e.g., EXCEPARL SS manufactured by Kao Corporation), cetyl palmitate (e.g., AMREPS PC manufactured by Kokyu Alcohol Kogyo Co., Ltd.), palmityl stearate, myristyl myristate, lauryl laurate, myricyl cerotinate, and behenyl montanate;

petroleum waxes such as paraffin wax, microcrystalline wax, and petrolatum;

vegetable waxes such as candelilla wax, carnauba wax, rice wax, wood wax, jojoba oil, jojoba solid wax, and jojoba ester;

animal waxes such as beeswax, lanolin, and whale wax;

mineral waxes such as montan wax and hydrogenated wax;

a hydrogenated castor oil or a hydrogenated castor oil derivative;

modified waxes such as montan wax derivative, paraffin wax derivative, microcrystalline wax derivative, or polyethylene wax derivative;

higher fatty acids such as behenic acid, arachidic acid, stearic acid, palmitic acid, myristic acid, lauric acid, oleic acid, and erucic acid;

higher alcohols such as stearyl alcohol and behenyl alcohol;

hydroxystearic acids such as 12-hydroxystearic acid;

12-hydroxystearic acid derivatives;

fatty acid amides such as lauric acid amide, stearic acid amide, behenic acid amide, oleic acid amide, erucic acid amide, ricinoleic acid amide, and 12-hydroxystearic acid amide (e.g., NIKKA amide series manufactured by Nippon Kasei Chemical Co., Ltd., ITOWAX series manufactured by Ito Oil Chemicals Co., Ltd., and FATTYAMID series manufactured by Kao Corporation);

N-substituted fatty acid amides such as N-stearyl stearic acid amide and N-oleyl palmitic acid amide;

special fatty acid amides such as N,N'-ethylene bis-stearyl amide, N,N'-ethylene bis-12-hydroxystearyl amide, and N,N'-xylylene bis-stearyl amide;

higher amines such as dodecyl amine, octadecyl amine, or tetradecyl amine;

fatty acid ester compounds such as glycerin fatty acid ester, sorbitan fatty acid ester, propylene glycol fatty acid ester, ethylene glycol fatty acid ester, and polyoxyethylene fatty acid ester (e.g., EMALLEX series manufactured by Nihon Emulsion Co., Ltd., RIKEMAL series manufactured by Riken Vitamin Co., Ltd., and POEM series manufactured by Riken Vitamin Co., Ltd.);

sucrose fatty acid esters such as sucrose stearate and sucrose palmitate (e.g., RYOTO sugar ester series manufactured by Mitsubishi-Kagaku Foods Corporation);

synthetic waxes such as polyethylene wax and α-olefin maleic anhydride copolymer wax (e.g., UNILIN series manufactured by Baker-Petrolite);

dimer acids; and dimer diols (e.g., PRIPOR series manufactured by CRODA Inc.).

One or a plurality of these waxes may be contained in an actinic radiation-curable inkjet ink. In the case of using a commercially available product, which is a mixture of a plurality of waxes in many cases, the product may be separated and purified on an as needed basis.

The wax is preferably an aliphatic ketone compound, an aliphatic monoester compound, a higher fatty acid, a higher alcohol, or a fatty acid amide, more preferably an aliphatic ketone compound or an aliphatic monoester compound.

The amount of the wax added to an actinic radiation-curable inkjet ink relative to the whole amount of the ink is preferably 1.0 to 10 wt %, more preferably 1.5 to 7 wt %. In the case that two or more waxes are included, the total amount of the waxes is preferably in the range.

If the wax content is less than 1.0 wt %, the actinic radiation-curable inkjet ink may have insufficient sol-gel phase transition. If the wax content is more than 10 wt %, the ink ejection property from an inkjet head may occasionally be reduced.

[Hydrogen-Bonding Gelling Agent]

The actinic radiation-curable inkjet ink may include a hydrogen-bonding gelling agent to assist the sol-gel phase transition by the wax. The hydrogen-bonding gelling agent includes a hydrogen atom bound to an atom with a large electronegativity (electronegative atom) through a covalent bond. The hydrogen-bonding gelling agent may undergo gelation by forming a metastable fibrous structure in a solvent by intermolecular hydrogen bonding, in which the solvent is encapsulated in the network of the fiber structure.

Examples of the hydrogen-bonding gelling agents include fatty acid insulins such as stearic acid inulin; fatty acid dextrins such as dextrin palmitate and dextrin myristate (e.g., RHEOPEARL series manufactured by Chiba Flour Milling Co., Ltd.); glyceryl behenate/eicosadioate; polyglyceryl behenate/eicosadioate (e.g., NOMCORT series manufactured by The Nisshin OilliO Group, Ltd.); amide compounds such as N-lauroyl-L-glutamic acid dibutyl amide and N-(2-ethylhexanoyl)-L-glutamic acid dibutyl amide (available from Ajinomoto Fine-Techno Co., Inc.); dibenzylidene sorbitols such as 1,3:2,4-bis-O-benzylidene-D-glucitol (GEL ALL D available from New Japan Chemical Co., Ltd.); and low molecular oil gelling agents according to Japanese Patent Application Laid-Open Nos. 2005-126507, 2005-255821, and 2010-111790.

The amount of the hydrogen-bonding gelling agent in an actinic radiation-curable inkjet ink is preferably 0.1 to 10 wt %, more preferably 1 to 5 wt %. With an excessive amount of the hydrogen-bonding gelling agent, the ink ejecting property from an inkjet head may be reduced.

[Photopolymerization Initiator]

The actinic radiation-curable inkjet ink further contains a photopolymerization initiator.

The photopolymerization initiator includes an intramolecular bond cleaving type and an intramolecular hydrogen withdrawing type. Examples of the intramolecular bond cleaving type photopolymerization initiator include acetophenones such as diethoxy acetophenone, 2-hydroxy-2-methyl-1-phenyl propan-1-one, benzyl dimethyl ketal, 1-(4-isopropyl phenyl)-2-hydroxy-2-methyl propan-1-one, 4-(2-hydroxy ethoxy) phenyl-(2-hydroxy-2-propyl) ketone, 1-hydroxy cyclohexyl phenyl ketone, 2-methyl-2-morpholino-(4-thio methylphenyl) propan-1-one, and 2-benzyl-2-dimethylamino-1-(4-morpholino phenyl)-butanone; benzoins such as benzoin, benzoin methyl ether and benzoin isopropyl ether; acyl phosphine oxides such as 2,4,6-trimethyl benzoin diphenyl phosphine oxide; benzyl, and methylphenyl glyoxy ester.

Examples of the intramolecular hydrogen withdrawing type photopolymerization include benzophenones such as benzophenone, o-benzoyl benzoic acid methyl-4-phenyl benzophenone, 4,4'-dichloro benzophenone, hydroxy benzophenone, 4-benzoyl-4'-methyldiphenyl sulfide, acrylated benzophenone, 3,3',4,4'-tetra-(t-butyl peroxy carbonyl) benzophenone; and 3,3'-dimethyl-4-methoxy benzophenone; thioxanthones such as 2-isopropyl thioxanthone, 2,4-dimethyl thioxanthone, 2,4-diethyl thioxanthone, and 2,4-dichloro thioxanthone; aminobenzophenones such as Michler's ketone and 4,4'-diethylaminobenzophenone; 10-butyl-2-chloro acridone, 2-ethyl anthraquinone, 9,10-phenanthrene quinone, and camphor quinone.

The photopolymerization initiator content in an actinic radiation-curable inkjet ink is preferably 0.01 wt % to 10 wt %, though depending on the types of actinic radiation and photopolymerizable compound.

The photopolymerization initiator in an actinic radiation-curable inkjet ink may include a photoacid generating agent. As such a photoacid generating agent, a compound used for chemical amplification type photoresists or photo-cationic polymerization is used (refer to pages 187 to 192 of "Imaging Yo Yuki Zairyo (Organic Materials Used for Imaging Applications)" edited by The Japanese Research Association for Organic Electronics Materials published by Bunshin Publishing (1993)).

If necessary, a photopolymerization initiator auxiliary agent, a polymerization inhibitor, or the like may be further contained in the actinic radiation-curable inkjet ink. The photopolymerization initiator auxiliary agent may be a tertiary amine compound and is preferably an aromatic tertiary amine compound. Examples of the aromatic tertiary amine compound include N,N-dimethylaniline, N,N-diethylaniline, N,N-dimethyl-p-toluidine, N,N-dimethylamino-p-benzoic acid ethyl ester, N,N-dimethylamino-p-benzoic acid isoamyl ethyl ester, N,N-dihydroxy ethylaniline, triethylamine, and N,N-dimethyl hexylamine. Among them, N,N-dimethylamino-p-benzoic acid ethyl ester and N,N-dimethylamino-p-benzoic acid isoamyl ethyl ester are preferable. The actinic radiation-curable inkjet ink may include only one or a plurality of these compounds.

Examples of the polymerization inhibitor include (alkyl) phenol, hydroquinone, catechol, resorcin, p-methoxyphenol, t-butyl catechol, t-butyl hydroquinone, pyrogallol, 1,1-picrylhydrazine, phenothiazine, p-benzoquinone, nitrosobenzene, 2,5-di-t-butyl-p-benzoquinone, dithiobenzoyl disulfide, picric acid, cupferrone, aluminum N-nitrosophenyl hydroxylamine, tri-p-nitrophenylmethyl, N-(3-oxyanilino-1, 3-dimethylbutylidene)aniline oxide, dibutyl cresol, cyclohexanone oxime cresol, guaiacol, o-isopropylphenol, butyraldoxime, methyl ethyl ketoxime, and cyclohexanone oxime.

[Colorant]

The actinic radiation-curable inkjet ink further includes a colorant. The colorant may be a dye or a pigment. A pigment is more preferred as it has excellent dispersibility in the ink components and excellent weather resistance.

The dye may be an oil-soluble dye or the like. Examples of the oil soluble dye include the following various dyes.

Examples of magenta dye include MS Magenta VP, MS magenta HM-1450, HM Magenta HSo-147 (all manufactured by Mitsui-Toatsu Chemicals), AIZEN SOT Red-1, AIZEN SOT Red-2, AIZEN SOT Red-3, AIZEN SOT Pink-1, SPIRON Red GEH SPECIAL (all manufactured by Hodogaya Chemical), RESOLIN Red FB 200%, MACROLEX Red Violet R, MACROLEX ROTSB (all manufactured by of Bayer Japan), KAYASET Red B, KAYASET Red 130, KAYASET Red 802 (all manufactured by Nippon Kayaku), PHLOXIN, ROSE BENGAL, ACID Red (all manufactured by Daiwa Kasei), HSR-31, DIARESIN Red K (all manufactured by Mitsubishi-Kasei), and Oil Red (manufactured by BASF Japan).

Examples of cyan dye include MS Cyan HM-1238, MS Cyan HSo-16, HM Cyan HSo-144, MS Cyan VPG (all manufactured by Mitsui-Toatsu Chemical), AIZEN SOT Blue-4 (manufactured by Hodogaya Chemical Company), RESOLIN BR, Blue BGLN 200%, MACROLEX Blue RR, CERES Blue GN, SIRIUS SUPRA TURQ, Blue Z-BGL, SIRIUS SUPRA TURQ, Blue FB-LL 330% (all manufactured by Bayer Japan), KAYASET Blue FR, KAYASET Blue N, KAYASET Blue 814, Turq Blue GL-5 200, Light Blue BGL-5 200 (all manufactured by Nippon Kayaku), DAIWA Blue 7000, Olosol Fast Blue GL (all manufactured by Daiwa Kasei), DIARESIN Blue P (manufactured by Mitsubishi-Kasei), SUDAN Blue 670, NEOPEN Blue 808, and ZAPON Blue 806 (all manufactured by BASF Japan).

Examples of yellow dye include MS Yellow HSM-41, Yellow KX-7, Yellow EX-27 (Mitsui-Toatsu Chemical), AIZEN SOT Yellow-1, AIZEN SOT Yellow-3, AIZEN SOT Yellow-6 (all manufactured by Hodogaya Chemical), MACROLEX Yellow 6G, MACROLEX FLUOR, Yellow 10GN (all manufactured by Bayer Japan), KAYASET Yellow SF-G, KAYASET Yellow 2G, KAYASET Yellow A-G, KAYASET Yellow E-G (all manufactured by Nippon Kayaku), DAIWA Yellow 330HB (manufactured by of Daiwa Kasei), HSY-68 (manufactured by Mitsubishi-Kasei), SUDAN Yellow 146, and NEOPEN Yellow 075 (all manufactured by BASF Japan).

Examples of Black dye include MS Black VPC (manufactured by Mitsui-Toatsu Chemical), AIZEN SOT Black-1, AIZEN SOT Black-5 (all manufactured by Hodogaya Chemical), RESORIN Black GSN 200%, RESORIN Black BS (all manufactured by Bayer Japan), KAYASET Black SF-G, KAYASET A-N (manufactured by Nippon Kayaku), DAIWA Black MSC (manufactured by Daiwa Kasei), HSB-202 (manufactured by Mitsubishi-Kasei), NEPTUNE Black X60, and NEOPEN Black X58 (all manufactured by BASF Japan).

The pigment is not specifically limited, and may be, for example, an organic pigment or an inorganic pigment with a color index number in the following.

Examples of red or magenta pigment include Pigment Red 3, 5, 19, 22, 31, 38, 43, 48:1, 48:2, 48:3, 48:4, 48:5, 49:1, 53:1, 57:1, 57:2, 58:4, 63:1, 81, 81:1, 81:2, 81:3, 81:4, 88, 104, 108, 112, 122, 123, 144, 146, 149, 166, 168, 169, 170, 177, 178, 179, 184, 185, 208, 216, 226, 257, Pigment Violet 3, 19, 23, 29, 30, 37, 50, 88, Pigment Orange 13, 16, 20, 36. Examples of blue or cyan pigment include Pigment Blue 1, 15, 15:1, 15:2, 15:3, 15:4, 15:6, 16, 17-1, 22, 27, 28, 29, 36, 60. Examples of green pigment include Pigment Green 7, 26, 36, 50. Examples of yellow pigment include Pigment Yellow 1, 3, 12, 13, 14, 17, 34, 35, 37, 55, 74, 81, 83, 93, 94, 95, 97, 108, 109, 110, 137, 138, 139, 153, 154, 155, 157, 166, 167, 168, 180, 185, 193. Examples of black pigment include Pigment Blacks 7, 28, and 26.

Examples of commercially available pigment include Chromo Fine Yellow 2080, 5900, 5930, AF-1300, 2700L, Chromo Fine Orange 3700L, 6730, Chromo Fine Scarlet 6750, Chromo Fine Magenta 6880, 6886, 6891N, 6790, 6887, Chromo Fine Violet RE, Chromo Fine Red 6820, 6830, Chromo Fine Blue HS-3, 5187, 5108, 5197, 5085N, SR-5020, 5026, 5050, 4920, 4927, 4937, 4824, 4933GN-EP, 4940, 4973, 5205, 5208, 5214, 5221, 5000P, Chromo Fine Green 2GN, 2GO, 2G-550D, 5310, 5370, 6830, Chromo Fine Black A-1103, Seikafast Yellow 10 GH, A-3, 2035, 2054, 2200, 2270, 2300, 2400(B), 2500, 2600, ZAY-260, 2700(B), 2770, Seikafast Red 8040, C405(F), CA120, LR-116, 1531B, 8060R, 1547, ZAW-262, 1537B, GY, 4R-4016, 3820, 3891, ZA-215, Seikafast Carmine 6B1476T-7, 1483LT, 3840, 3870, Seikafast Bordeaux 10B-430, Seikalight Rose R40, Seikalight Violet B800, 7805, Seikafast Maroon 460N, Seikafast Orange 900, 2900, Seikalight Blue C718, A612, Cyanine Blue 4933M, 4933GN-EP, 4940, 4973 (manufactured by Dainichiseika Color & Chemicals Mfg. Co., Ltd.);

KET Yellow 401, 402, 403, 404, 405, 406, 416, 424, KET Orange 501, KET Red 301, 302, 303, 304, 305, 306, 307, 308, 309, 310, 336, 337, 338, 346, KET Blue 101, 102, 103, 104, 105, 106, 111, 118, 124, KET Green 201 (manufactured by Dainippon Ink and Chemicals);

Colortex Yellow 301, 314, 315, 316, P-624, 314, U10GN, U3GN, UNN, UA-414, U263, Finecol Yellow T-13, T-05, Pigment Yellow1705, Colortex Orange 202, Colortex Red101, 103, 115, 116, D3B, P-625, 102, H-1024, 105C, UFN, UCN, UBN, U3BN, URN, UGN, UG276, U456, U457, 105C, USN, Colortex Maroon601, Colortex BrownB610N, Colortex Violet600, Pigment Red 122, Colortex Blue516, 517, 518, 519, A818, P-908, 510, Colortex Green402, 403, Colortex Black 702, U905 (manufactured by SANYO COLOR WORKS, Ltd.);

Lionol Yellow1405G, Lionol Blue FG7330, FG7350, FG7400G, FG7405G, ES, ESP-S (manufactured by TOYO INK CO., LTD.), Toner Magenta E02, Permanent RubinF6B, Toner Yellow HG, Permanent Yellow GG-02, Hostapeam BlueB2G (manufactured by Hoechst Industry Ltd.);

Novoperm P-HG, Hostaperm Pink E, Hostaperm Blue B2G (manufactured by Clariant (Japan) K.K.);

Carbon Black #2600, #2400, #2350, #2200, #1000, #990, #980, #970, #960, #950, #850, MCF88, #750, #650, MA600, MA7, MA8, MA11, MA100, MA100R, MA77, #52, #50, #47, #45, #45L, #40, #33, #32, #30, #25, #20, #10, #5, #44, CF9 (manufactured by Mitsubishi Chemical Corporation).

Dispersion of the pigment can be performed using a ball mill, sand mill, attritor, roll mill, agitator, Henschel mixer, colloid mill, ultrasound homogenizer, pearl mill, wet jet mill, or paint shaker, for example. Dispersion of the pigment is preferably performed such that the pigment particles have a volume average particle diameter of 0.08 to 0.5 µm and a maximum particle diameter of 0.3 to 10 µm (more preferably 0.3 to 3 µm). Dispersion of the pigment is adjusted by selections of pigments, dispersant, and dispersion medium, dispersing conditions, filtering conditions, and the like. In the present invention, the volume average particle diameter represents the secondary volume average particle diameter, which can be obtained with a commercially available particle size analyzer based for example on light scattering, electrophoresis, or laser Doppler method. Specific examples of the particle size analyzer include a laser diffraction particle size analyzer SLAD 1100 manufactured by Shimadzu Corporation, HORIBA LA-920, and ZETASIZER 1000 manufactured by Malvern Instruments Ltd.

The actinic radiation-curable inkjet ink may further include a dispersant to enhance the dispersibility of pigment. Examples of the dispersant include hydroxyl group-containing carboxylic acid esters, salts of long-chain polyaminoamides and high molecular weight acid esters, salts of high molecular weight polycarboxylic acids, salts of long-chain polyaminoamides and polar acid esters, high molecular weight unsaturated acid esters, copolymers, modified polyurethanes, modified polyacrylates, polyether ester-type anionic active agents, naphthalenesulfonic acid formalin condensate salts, aromatic sulfonic acid formalin condensate salts, polyoxyethylene alkyl phosphoric acid esters, polyoxyethylene nonyl phenyl ethers, and stearylamine acetates. Examples of commercially available dispersants include SOLSPERSE series from Avecia Biotechnology, Inc. and PB series from Ajinomoto Fine-Techno Co., Inc.

The actinic radiation-curable inkjet ink may further include a dispersion promoter on an as needed basis. The dispersion promoter may be selected according to the type of the pigment.

The total amount of the dispersant and dispersion promoter is preferably 1 to 50 wt % relative to the pigment.

The actinic radiation-curable inkjet ink may further include a dispersion medium to disperse the pigment on an as needed basis. Although a solvent as a dispersion medium may be contained in the ink, the photopolymerizable compound (a low-viscosity monomer, in particular) preferably serves as a dispersion medium in order to prevent the solvent from remaining on the formed image.

The content of the pigment or dye is preferably from 0.1 to 20 wt %, and more preferably from 0.4 to 10 wt % relative to the actinic radiation-curable inkjet ink. If the content of the pigment or dye is excessively low, color exhibition of an image to be obtained is insufficient, and if it is excessively high, the ink viscosity is increased to lower the ejection property.

[Additional Components]

Additional components may be further contained in the actinic radiation-curable inkjet ink if necessary. The additional components can be various additives and other resins. Examples of the additives include surfactants, leveling agents, matting agents, UV absorbers, IR absorbers, antibacterial agents, and basic compounds that serve to increase the storage stability of ink. Examples of the basic compounds include basic alkali metal compounds, basic alkali earth metal compounds, and basic organic compounds such as amines Examples of other resins include resins for adjusting the physical properties of a cured film; examples thereof include polyester resins, polyurethane resins, vinyl resins, acrylic resins, rubber resins, and waxes.

The actinic radiation-curable inkjet ink may be obtained by mixing the photopolymerizable compound, the wax, the photopolymerization initiator, the colorant, and optional additional component(s) under heating conditions. The produced mixed liquid is preferably filtrated with a suitable filter.

[Actinic Radiation-Curable Inkjet Ink]

The actinic radiation-curable inkjet ink undergoes temperature-induced reversible sol-gel phase transition as described above. The sol-gel phase transition type actinic radiation-curable inkjet ink is in a sol state at high temperatures (e.g., about 80° C.), so that the ink can be discharged from an inkjet recording head. Once the actinic radiation-curable inkjet ink is discharged at a high temperature, ink droplets (dots) are landed to a recording medium and undergo gelation by natural cooling. Consequently, combining of neighboring dots is prevented and thus mage quality improves.

For enhancement of the ejection property of the sol-gel phase transition type ink, the viscosity of the ink at a high temperature is preferably the same as or lower than a predetermined value. Specifically, the viscosity at 80° C. of the actinic radiation-curable inkjet ink is preferably from 3 to 20 mPa·s. In order to prevent combining of neighboring dots, the ink viscosity at room temperature after landing preferably has a certain value or more. Specifically, the viscosity at 25° C. of the actinic radiation-curable inkjet ink is preferably 1,000 mPa·s or more.

The gelation temperature of the sol-gel phase transition type ink is preferably 40° C. or higher and 70° C. or lower, and more preferably 50° C. or higher and 65° C. or lower. In a case where the ejection temperature is near 80° C., if the gelation temperature of the ink exceeds 70° C., gelation tends to occur at the time of ejection and ejection property is lowered. If the gelation temperature is lower than 40° C., the ink after landed to a recording medium does not undergo quick gelation. The gelation temperature is defined as a temperature when fluidity is lowered by gelation of the ink in a sol state in a process of cooling the sol-state ink.

The viscosity at 80° C. and viscosity and gelation temperature at 25° C. of the sol-gel phase transition type ink can be found by measuring a temperature change in dynamic viscoelasticity of the ink using a rheometer. Specifically, by heating the ink to 100° C. and cooling to 20° C. with conditions including shear rate of 11.7 (1/s) and temperature decrease rate of 0.1° C./s, a temperature change curve of the viscosity is obtained. The viscosity at 80° C. and the viscosity at 25° C. can be obtained by reading each of the viscosities at 80° C. and 25° C. in a temperature change curve of the viscosity. The gelation temperature can be obtained as a temperature at which the viscosity is 200 mPa·s in a temperature change curve of the viscosity.

As for the rheometer, stress control type rheometer Physica MCR300 manufactured by Anton Paar can be used. The size of the corn plate can be 75 mm and the corn angle can be 1.0°.

In order to enhance the ejection property of the ink from a discharging recording head, the temperature of the sol-gel phase transition type ink is preferably set at (gelling temperature+10)° C. to (gelling temperature+30)° C. of the ink, when filled in the discharging recording head. If the temperature of an ink in a discharging recording head is lower than (gelling temperature+10)° C., the ink undergoes gelation in the discharging recording head or at the surface of a nozzle, so that the ink ejection property tends to be reduced. If the temperature of the ink inside the discharging recording head is higher than (gelation temperature+30)° C., the ink becomes at excessively high temperature, so that the ink components may be deteriorated.

<Image Forming Method>

The image forming method according to an embodiment includes: 1) ejecting the actinic radiation-curable inkjet ink to a recording medium; and 2) curing the ink landed to the recording medium with actinic radiation.

1) In the ejecting, the inkjet ink accommodated in a discharging recording head may be discharged as droplets toward a recording medium through a nozzle. On this occasion, the temperature of the inkjet ink accommodated in the discharging recording head is set at a temperature such that the wax content contained in the ink is equal to or less than the saturated dissolution amount of the wax in the ink. In other words, the wax is dissolved in the inkjet ink accommodated in the discharging recording head.

The temperature of the recording medium in discharging may be arbitrarily adjusted according to the gelling temperature of the actinic radiation-curable inkjet ink and the type of recording medium.

2) In the curing step, the ink landed to a recording medium is irradiated with actinic radiation. The actinic radiation to be directed may be properly selected depending on the type of photopolymerizable compound, including UV rays, electron beams, and the like.

In the curing step, the temperature of the recording medium is set at a temperature such that the saturation solubility of wax in the ink is 0.5 wt % or less, preferably 0.1 wt % or less. In other words, the wax is precipitated (crystallized) as much as possible in the ink landed to a recording medium. The wax dissolved in the ink after landing, i.e. uncrystallized wax, moves to the surface of cured product after image formation. The wax crystallized on the surface of the cured product causes blooming Maximizing the precipitation of wax before curing of the ink, therefore, prevents blooming The temperature of a recording medium in the curing step can be determined from the saturation solubility curve which is a plot of saturation solubility of wax in the ink versus temperature. In FIG. 1, examples of the saturation solubility curve for various inks are shown. For example, for ink A in FIG. 1, the saturation solubility of wax reaches 0.5 wt % at 33° C. The temperature of recording medium in the curing step of ink A is therefore set at 33° C. or lower. As another example, for ink C in FIG. 1, the saturation solubility of wax reaches 0.5 wt % at 55° C. The temperature of recording medium in the curing step of ink C is therefore set at 55° C. or lower. The temperature of recording medium is adjusted by means of a temperature adjusting section or the like disposed in the inkjet recording apparatus.

In the case of using a plurality of waxes, the temperature of a recording medium during curing is controlled preferably at a temperature such that the saturation solubility of the wax having a highest saturation solubility at the same temperature is 0.5 wt % or less.

The temperature of recording medium in the discharging step and the temperature of recording medium in the curing step are not necessarily the same, and they may be independently controlled.

An inkjet recording apparatus of actinic radiation-curable inkjet type is described in the following. The inkjet recording apparatus of an actinic radiation-curable inkjet type includes line recording type (single pass recording type) apparatus and serial recording type apparatus. Although the type may be suitably selected depending on desired resolution or recording speed, the line recording (single pass recording type) is preferred from the viewpoint of high speed recording.

Figure 2A:
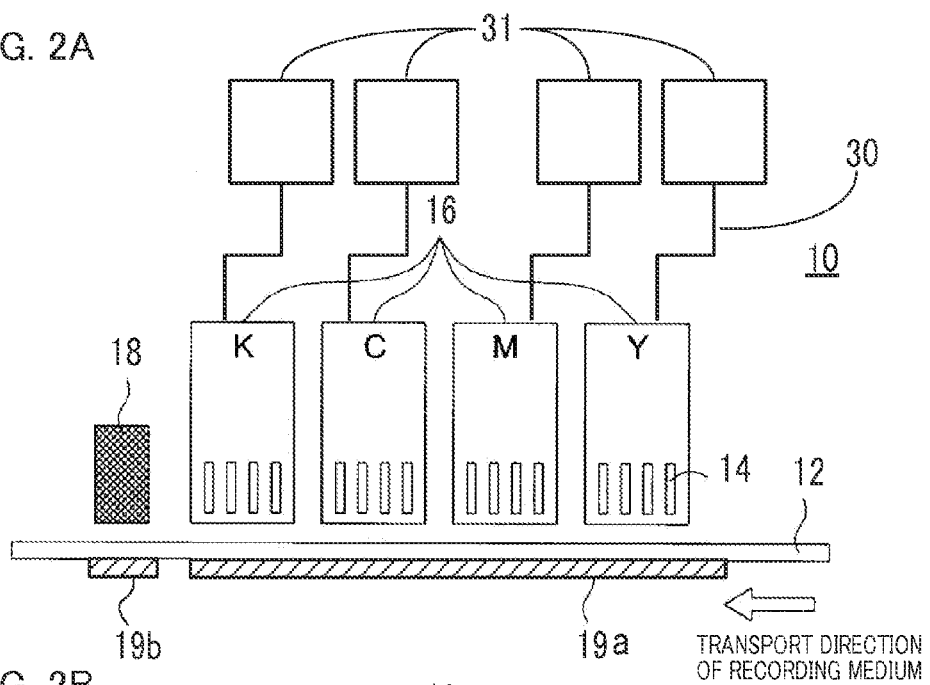
FIGS. 2A and 2B illustrate examples of the configuration of main parts of a line recording type inkjet recording apparatus.
Figure 2B:
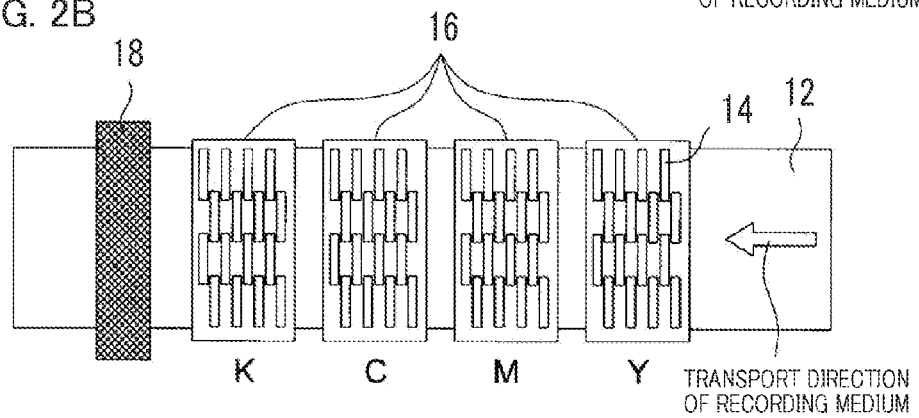

FIGS. 2A and 2B illustrate an example of the configuration of main parts of a line recording type inkjet recording apparatus. FIG. 2A is a side view and FIG. 2B is a top view. As illustrated in FIGS. 2A and 2B, inkjet recording apparatus 10 has head carriage 16 for accommodating a plurality of discharging recording head 14, ink channel 30 connected to head carriage 16, ink tank 31 for storing the ink to be fed via ink channel 30, and actinic irradiation section 18 for covering ink tank 31 and the entire width of recording medium 12 and also arranged at a downstream side of head carriage 16 (conveyance direction of the recording medium), and temperature control section 19 (19a and 19b) installed on a backside of recording medium 12.

Head carriage 16 is fixedly arranged so as to cover the entire width of recording medium 12 and accommodates a plurality of discharging recording heads 14 that are installed for each color. Discharging recording head 14 is designed to receive ink. For example, an ink can be supplied directly from a non-illustrated ink cartridge or the like that is added in a freely-mountable manner to inkjet recording apparatus 10 or by non-illustrated means for ink supply.

A plurality of discharging recording heads 14 is installed for each color in the conveyance direction of recording medium 12. The number of discharging recording heads 14 that is arranged in the conveyance direction of recording medium 12 is determined based on the nozzle density of discharging recording head 14 and the resolution of a printed image. For example, when an image having the resolution of 1,440×1,440 dpi is formed by using discharging recording head 14 with a drop volume of 2 pl and a nozzle density of 360 dpi, four of discharging recording head 14 can be arranged in a staggered manner relative to the conveyance direction of recording medium 12. Further, when an image having the resolution of 720×720 dpi is formed by using discharging recording head 14 with a drop volume of 6 pl and a nozzle density of 360 dpi, two of discharging recording head 14 can be arranged in a staggered manner. As described herein, dpi represents the number of liquid droplets (dots) per 2.54 cm.

Actinic irradiation section 18 covers the entire width of recording medium 12 and it is arranged at a downstream side of head carriage 16 relative to the conveyance direction of the recording medium. Actinic irradiation section 18 irradiates, with light, the liquid droplets which have been discharged from discharging recording head 14 and landed to the recording medium so as to cure the liquid droplets.

In the case that the actinic radiation is UV ray, examples of actinic irradiation section 18 (UV radiation means) include a fluorescent tube (e.g., a low-pressure mercury lamp and a germicidal lamp), a cold cathode tube, an UV laser, a low-, medium-, or high-pressure mercury lamp having an operating pressure of several hundred Pa to 1 MPa, a metal halide lamp, and an LED. From the viewpoint of ink curability, UV irradiation means for irradiation with an illuminance of 100 mW/cm$^2$ or more, specifically including a high-pressure mercury lamp, a metal halide lamp, an LED, or the like is preferred. From the viewpoint of low power consumption, an LED is more preferred. More specifically, a water-cooled 395-nm LED manufactured by Phoseon Technology may be used.

In the case that the actinic radiation is electron beams, examples of actinic irradiation section 18 (electron beam radiation means) include electron beam radiation means using the scanning method, curtain beam method, or broad beam method. From the viewpoint of processing capacity, electron beam radiation means using the curtain beam method is preferred. Examples of the electron beam radiation means include "CURETRON EBC-200-20-30" manufactured by NHV Corporation and "Min-EB" manufactured by AIT.

Temperature control section 19 (19a and 19b) is installed on a backside of recording medium 12 and it maintains recording medium 12 at a predetermined temperature. Temperature control section 19 can be various heaters or the like, for example.

Hereinafter, the image recording method using line recording type inkjet recording apparatus 10 is described. Recording medium 12 is conveyed to a region between head carriage 16 of inkjet recording apparatus 10 and temperature control section 19a. At the same time, recording medium 12 is adjusted to a predetermined temperature by temperature control section 19a. Subsequently, the ink at a high temperature is discharged from discharging recording head 14 of head carriage 16 and attached to (landed on) recording medium 12. Further, the ink droplets attached to recording medium 12 are cured by irradiation with actinic radiation using actinic irradiation section 18.

In order to enhance the ink ejection property, when the ink is discharged from discharging recording head 14, the ink temperature in discharging recording head 14 is set preferably at a temperature higher than the gelling temperature of the ink by 10 to 30° C. If an ink temperature in discharging recording head 14 is lower than (gelling temperature+10)° C., the ink undergoes gelation in discharging recording head 14 or the surface of a nozzle, so that the ink ejection property tends to be reduced. On the other hand, if an ink temperature in discharging recording head 14 is higher than (gelling temperature+30)° C., the excessively high ink temperature may occasionally cause degradation of ink components.

The amount of a droplet discharged from each of the nozzles of discharging recording head 14 depends on the resolution of an image and is preferably 0.5 pl to 10 pl, more preferably 1 pl to 4.0 pl for formation of high-resolution images.

In order to prevent neighboring ink droplets from being combined, actinic radiation is applied within 10 seconds after attachment of the ink droplets to a recording medium, preferably within 0.001 to 5 seconds, more preferably within 0.01 to 2 seconds. Preferably the actinic radiation is applied after discharging the ink from all discharging recording heads 14 accommodated in head carriage 16. On this occasion, the temperature of recording medium 12 is adjusted to a temperature at which the saturation solubility of wax in the ink is 0.5 wt % or less, preferably 0.1 wt % or less, by temperature control section 19b. On this occasion, the temperature of recording medium 12 may be the same as or different from the temperature of recording medium 12 during ejection of the ink, i.e. the temperature controlled by temperature control section 19a.

When the actinic radiation is electron beams, the accelerating voltage of the electron beam radiation is preferably 30 to 250 kV, more preferably 30 to 100 kV, for sufficient curing. In the case of an accelerating voltage of 100 to 250 kV, the radiation level of electron beams is preferably 30 to 100 kGy, more preferably 30 to 60 kGy.

The total film thickness of the ink after curing is preferably from 2 to 25 μm. The term "total film thickness of the ink" refers to a maximum value of the film thickness of the ink drawn to a recording medium.

Figure 3:
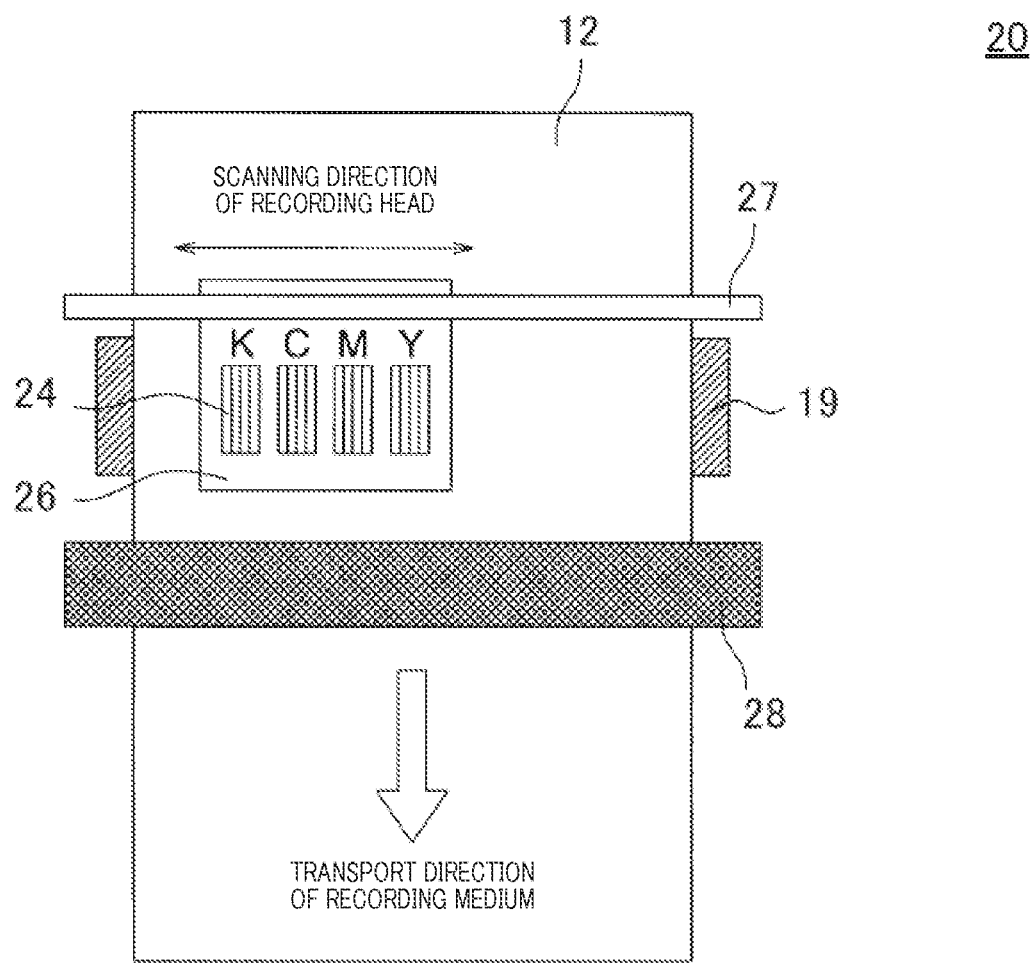
FIG. 3 illustrates an example of the configuration of main parts of a serial recording type inkjet recording apparatus.

FIG. 3 is a diagram illustrating an example of the configuration of main parts of a serial recording type inkjet recording apparatus 20. As illustrated in FIG. 3, inkjet recording apparatus 20 can be configured in the same manner as that depicted in FIGS. 2A and 2B except that it has head carriage 26 which has a width narrower than the entire width of the recording medium and accommodates a plurality of discharging recording heads 24 instead of head carriage 16, and guide section 27 for operating head carriage 26 in the width direction of recording medium 12.

In serial recording type inkjet recording apparatus 20, head carriage 26 discharges the ink from discharging recording head 24 accommodated in head carriage 26 while moving along guide section 27 in the width direction of recording medium 12. Once head carriage 26 moves completely in the width direction of recording medium 12 (for each pass), recording medium 12 is delivered in the conveyance direction and light is radiated by actinic irradiation section 28. Except those operations, the image is recorded in almost the same manner as line recording type inkjet recording apparatus 10 that is described above.

EXAMPLES

In the following, the present invention is described in more detail with reference to Examples, which however shall not be construed as limiting the scope of the present invention.

[Manufacturing of Actinic Radiation-Curable Inkjet Ink]

An actinic radiation-curable inkjet ink was prepared from the following components: photopolymerizable compound, wax, polymerization inhibitor, polymerization initiator, and pigment dispersion.

[Photopolymerizable Compound]

(Meth)Acrylate Compound A

Polyethylene glycol diacrylate (NK ESTER A-400 manufactured by Shin-Nakamura Chemical Co., Ltd., molecular weight: 508, amount of EO unit: 9, ClogP value: 0.47)

4EO-modified pentaerythritol tetraacrylate (SR494 manufactured by Sartomer Company, Inc., molecular weight: 528, ClogP value: 2.28)

6EO-modified trimethylolpropane triacrylate (SR499 manufactured by Sartomer Company, Inc., molecular weight: 560, ClogP value: 3.57)

(Meth)Acrylate Compound B

3PO-modified trimethylolpropane triacrylate (PHOTOMER 4072 manufactured by Cognis, molecular weight: 471, ClogP value: 4.90)

1,10-Decane diol dimethacrylate (NK ESTER DOD-N manufactured by Shin-Nakamura Chemical Co., Ltd., molecular weight: 310, ClogP value: 5.75)

Tricyclodecanedimethanol diacrylate (NK ESTER A-DCP manufactured by Shin-Nakamura Chemical Co., Ltd., molecular weight: 304, ClogP value: 4.69)

Other (Meth)Acrylate Compound

2PO-modified neopentyl glycol diacrylate (SR9003 manufactured by Sartomer Company, Inc., molecular weight: 328, ClogP value: 3.38)

[Wax]

Behenic acid (LUNAC BA manufactured by Kao Corporation, ClogP value: 10.1)

Erucic acid amide (NEUTRON S manufactured by Nippon Fine Chemical Co., Ltd., ClogP value: 9.0)

Aliphatic ketone (KAOWAX T1 manufactured by Kao Corporation, ClogP value: 15 or higher)

Stearyl stearate (EXCEPARL SS manufactured by Kao Corporation, ClogP value: 15 or more)

Behenyl Behenate (UNISTER M-2222SL manufactured by NOF Corporation, ClogP value: 15 or higher)

Behenyl alcohol (BEHENYL ALCOHOL 80R manufactured by Kokyu Alcohol Kogyo Co., Ltd., ClogP value: 10.3)

Glycerin monobehenate (POEM B100, Riken Vitamin Co., Ltd, ClogP value: 9.3)

[Polymerization Inhibitor]

IRGASTAB UV10 (manufactured by Ciba Specialty Chemicals Inc.)

[Photopolymerization Initiator]

DAROCURE TPO (manufactured by Ciba Specialty Chemicals Inc.)

ITX (manufactured by DKSH)

[Pigment Dispersion]

Preparation of Pigment Dispersion 1 (M: Magenta)

The following dispersant, photopolymerizable compound, and polymerization inhibitor were placed in a stainless steel beaker. The mixture was heated with stirring for dissolution on a hot plate at 65° C. for 1 hour. The produced solution was cooled to room temperature, and 21 parts by weight of the following magenta pigment 1 was added thereto. The mixture was put and sealed together with 200 g of zirconia beads with a diameter of 0.5 mm into a glass bottle and subjected to dispersion treatment for 8 hours with a paint shaker. The zirconia beads were then removed and pigment dispersion 1 having the following composition was prepared.

[Composition of Pigment Dispersion 1]

Dispersant: 9 parts by weight of AJISPER PB824 (manufactured by Ajinomoto Fine-Techno Co., Inc.)

Photopolymerizable compound: 70 parts by weight of APG-200 (triethylene glycol diacrylate, manufactured by Shin-Nakamura Chemical Co., Ltd., molecular weight: 300, ClogP value: 2.21)

Polymerization inhibitor: 0.02 parts by weight of IRGASTAB UV10 1 (manufactured by Ciba Specialty Chemicals Inc.)

Magenta pigment 1: Pigment Red 122 (CHROMO FINE RED 6112JC manufactured by Dainichiseika Color & Chemicals Mfg. Co., Ltd.)

[Preparation of Inks A to P]

According to the compositions (parts by weight) shown in Tables 1 and 2, the mixture produced by mixing the components was heated to 80° C. with stirring. The produced solution was filtrated with a metal mesh filter #3,000 under heated conditions, and then cooled to prepare the ink. In Table 2, the unit for the amount of each component is part by weight.

Evaluation of Actinic Radiation-curable Inkjet Ink

[Solution Stability of Wax]

Each actinic radiation-curable inkjet ink was left standing in a thermostatic chamber at 100° C., for 4 hours, and the separation state of the ink was then verified by visual observation. The evaluation was made according to the following criteria. The results are shown in Tables 1 and 2.

A: Ink in a uniform state, without separation.
B: Ink in a slightly separated state.
C: Ink in a clearly separated state.

[Ink Odor]

Each actinic radiation-curable inkjet ink was heated to 100° C., and the odor was verified. The evaluation was made according to the following criteria. The results are shown in Tables 1 and 2.

A: No odor detected.
B: Slightly irritating odor detected.
C: Intense irritating odor detected.

[Measurement of Saturation Solubility of Wax]

Of the compositions shown in Table 1 and Table 2, the components except for wax were mixed, heated with stirring at 60° C. to obtain wax-free inks A to P. A small amount of wax shown in Table 1 and Table 2 was added to each of inks A to P, and the mixture was heated to 80° C. to dissolve the wax. The temperatures of the inks having respective wax concentrations were lowered while monitoring the dissolution of the wax, so that the saturation solubility (ratio of the saturated dissolution amount of the wax to the total weight of the ink) was determined. The saturation solubility was determined by visually observing the complete dissolution of wax, when the ink color is spread on a temperature-controlled PET film. The saturation solubility was measured for a plurality of temperatures. The results are shown in Tables 1 and 2. The saturation solubility curves for inks A to D are shown in FIG. 1.

The solubility of aliphatic ketone was measured for ink H, and the saturation solubility of stearyl stearate was measured for ink I.

TABLE 1

|  |  | Molecular weight | ClogP value | Ink A | Ink B | Ink C | Ink D | Ink E | Ink F | Ink G |
|---|---|---|---|---|---|---|---|---|---|---|
| Wax | Behenic acid |  | 10.1 | 5.0 |  |  |  |  |  |  |
|  | Erucic acid amide |  | 9.0 |  | 4.0 |  |  |  |  |  |
|  | Aliphatic ketone |  | 15 or higher |  |  | 3.0 |  |  |  |  |
|  | Stearyl stearate |  | 15 or higher |  |  |  | 4.0 |  |  |  |
|  | Behenyl behenate |  | 15 or higher |  |  |  |  | 2.0 |  |  |
|  | Behenyl alcohol |  | 10.3 |  |  |  |  |  | 4.0 |  |
|  | Glycerin monobehenate |  | 9.3 |  |  |  |  |  |  | 6.0 |

TABLE 1-continued

| | | Molecular weight | ClogP value | Ink A | Ink B | Ink C | Ink D | Ink E | Ink F | Ink G |
|---|---|---|---|---|---|---|---|---|---|---|
| (Meth)acrylate compound (A) | Polyethylene glycol #400 diacrylate | 508 | 0.47 | 30.0 | 20.0 | 20.0 | 10.0 | 5.0 | | 30.0 |
| | 4EO-modified pentaerythritol tetraacrylate | 528 | 2.28 | 10.0 | 10.0 | 15.0 | | 17.0 | 17.0 | 10.0 |
| | 6EO-modified trimethylolpropane triacrylate | 560 | 3.57 | 13.9 | 27.9 | 10.9 | 39.9 | 14.9 | 17.9 | 15.9 |
| (Meth)acrylate compound (B) | 3PO-modified trimethylolpropane triacrylate | 471 | 4.90 | 15.0 | 12.0 | 25.0 | | 15.0 | 25.0 | 12.0 |
| | 1,10-Decane diol dimethacrylate | 310 | 5.75 | | | | 20.0 | | | |
| | Tricyclodecanedimethanol diacrylate | 304 | 4.69 | | | | | 20.0 | | |
| Other (meth)acrylate compound | PO-modified NPG diacrylate | 328 | 3.38 | | | | | | 10.0 | |
| Polymerization inhibitor | | | | 0.1 | 0.1 | 0.1 | 0.1 | 0.1 | 0.1 | 0.1 |
| Photo initiator | TPO | | | 6.0 | 6.0 | 6.0 | 6.0 | 6.0 | 6.0 | 6.0 |
| | ITX | | | 1.0 | 1.0 | 1.0 | 1.0 | 1.0 | 1.0 | 1.0 |
| Pigment dispersion 1 | | | | 19.0 | 19.0 | 19.0 | 19.0 | 19.0 | 19.0 | 19.0 |
| Wax solubility stability | | | | A | A | A | A | A | A | A |
| Ink odor | | | | A | A | A | A | A | A | A |
| Saturation solubility at 10° C. | | | | | | 0.4 | | | | |
| Saturation solubility at 20° C. | | | | 0.2 | | | | | | |
| Saturation solubility at 25° C. | | | | | | | | 0.01 | | |
| Saturation solubility at 30° C. | | | | | | | | | 0.05 | |
| Saturation solubility at 40° C. | | | | 0.7 | 1.2 | 0.01 | 0.01 | | | 0.4 |
| Saturation solubility at 50° C. | | | | 2.0 | | 0.1 | | | 1.5 | |
| Saturation solubility at 55° C. | | | | | | | | 1.0 | | 1.0 |
| Saturation solubility at 60° C. | | | | | | 0.7 | | 0.6 | | |

TABLE 2

| | | Molecular weight | ClogP value | Ink H | Ink I | Ink J | Ink K | Ink L | Ink M | Ink N | Ink O | Ink P |
|---|---|---|---|---|---|---|---|---|---|---|---|---|
| Wax | Behenic acid | | 10.1 | | | | | | 0.5 | | | |
| | Erucic acid amide | | 9.0 | | | | | | | | | |
| | Aliphatic ketone | | 15 or higher | 1.5 | 1.5 | | | | | 3.0 | | 3.0 |
| | Stearyl stearate | | 15 or higher | | 1.5 | | | | | | | |
| | Behenyl behenate | | 15 or higher | 1.5 | | 1.1 | | | | 3.0 | | |
| | Behenyl alcohol | | 10.3 | | | | | | | | | |
| | Glycerin monobehenate | | 9.3 | | | | 8.0 | | | | | |
| (Meth)acrylate compound (A) | Polyethylene glycol #400 diacrylate | 508 | 0.47 | 20.0 | 20.0 | 20.0 | 20.0 | 30.0 | 30.0 | 27.9 | | |
| | 4EO-modified pentaerythritol tetraacrylate | 528 | 2.28 | | | | | 15.0 | 15.0 | | 35.0 | |
| | 6EO-modified trimethylolpropane triacrylate | 560 | 3.57 | 25.9 | 25.9 | 27.8 | 20.9 | 13.9 | 13.4 | | 35.9 | |
| (Meth)acrylate compound (B) | 3PO-modified trimethylolpropane triacrylate | 471 | 4.90 | 25.0 | 25.0 | 25.0 | 25.0 | 15.0 | 15.0 | 45.0 | | |
| | 1,10-Decane diol dimethacrylate | 310 | 5.75 | | | | | | | | | 30.0 |
| | Tricyclodecanedimethanol diacrylate | 304 | 4.69 | | | | | | | | | |
| Other (meth)acrylate compound | PO-modified NPG diacrylate | 328 | 3.38 | | | | | | | | | 40.9 |
| Polymerization inhibitor | | | | 0.1 | 0.1 | 0.1 | 0.1 | 0.1 | 0.1 | 0.1 | 0.1 | 0.1 |
| Photo initiator | TPO | | | 6.0 | 6.0 | 6.0 | 6.0 | 6.0 | 6.0 | 6.0 | 6.0 | 6.0 |
| | ITX | | | 1.0 | 1.0 | 1.0 | 1.0 | 1.0 | 1.0 | 1.0 | 1.0 | 1.0 |
| Pigment dispersion 1 | | | | 19.0 | 19.0 | 19.0 | 19.0 | 19.0 | 19.0 | 19.0 | 19.0 | 19.0 |
| Wax solubility stability | | | | A | A | A | B | A | A | A | C | A |
| Ink odor | | | | A | A | A | A | A | A | A | A | B |
| Saturation solubility at 10° C. | | | | | | | | | | | | |
| Saturation solubility at 20° C. | | | | | | | | | 0.2 | | | |
| Saturation solubility at 25° C. | | | | | | | 0.01 | | | | | |
| Saturation solubility at 30° C. | | | | 0.01 | 0.01 | | 0.4 | | | 0.01 | 0.01 | 0.02 |
| Saturation solubility at 40° C. | | | | | | | | | 0.7 | | | |
| Saturation solubility at 50° C. | | | | 0.1 | 0.7 | | | | | | | |
| Saturation solubility at 55° C. | | | | | | | | | | | | |
| Saturation solubility at 60° C. | | | | | | 0.6 | 1.0 | | | 0.7 | 0.6 | 1.0 |

As shown in Table 1 and Table 2, inks A to N and P that include the (meth)acrylate compound (B) had excellent solution stability of the wax. The deduced reason for this is that the (meth)acrylate compound (B) has high compatibility with the wax due to a high ClogP value (hydrophobicity). In contrast, ink O including no (meth)acrylate compound (B) had low solution stability of the wax and caused separation of the ink.

[Image Formation]

A monochrome image was formed for each actinic radiation-curable inkjet ink with a line-type inkjet recording apparatus. The temperature of the inkjet head of the inkjet recording apparatus was set to 80° C. Outline characters, 5 cm by 5 cm solid images, or density gradation patches were printed to a recording medium. After image formation, the image was irradiated with UV rays with an LED lamp (manufactured by Phoseon Technology, 395 nm, water-cooled LED) disposed downstream of the recording apparatus, so that the ink was cured. The temperature of a recording medium under LED radiation was controlled to a desired temperature with a temperature control apparatus installed at the lower part of the LED lamp.

As a discharging recording head, a piezo head having a nozzle diameter of 20 μm, a nozzle number of 512 (two rows of 256 nozzles, staggered arrangement, nozzle pitch per row: 360 dpi) was used. The discharge conditions include an amount of a droplet of 2.5 pl and an ejected droplet velocity of about 6 m/s, for recording with a resolution of 1,440 dpi by 1,440 dpi. The recording velocity was 500 mm/s. The image was formed under an environment at 23° C. and 55% RH. The term dpi represents the number of dots per 2.54 cm.

[Evaluation of Image]

(Evaluation of Blooming)

The 5 cm by 5 cm solid image formed on coated paper for printing A (OK TOP COAT, weight of paper in gram per square meter: 128 g/m$^2$, manufactured by Oji Paper Co., Ltd.) as a recording medium by the method as described above was stored in an environment at 40° C. for 1 month. The image after storage was visually observed and blooming was evaluated according to the following criteria. The results are shown in Table 3.

A: No precipitation is detected on the surface of image.

B: Thin precipitation is visually detected on the surface of image.

C: The surface of image is covered with powdered substance, which is visually detected.

(Evaluation of Rubfastness)

A 5 cm by 5 cm solid image was formed on coated paper for printing A (OK TOP COAT, weight of paper in gram per square meter: 128 g/m$^2$, manufactured by Oji Paper Co., Ltd.) as a recording medium by the method as described above. According to "JIS Standards K5701-1 6.2.3 Rub Resistance Test," coated paper for printing A cut to a size of 4 cm$^2$ was disposed on the image for rubbing to each other under a load of 500 g. Thereafter, an extent of decrease in the density of the image was visually observed and evaluation was performed according to the following criteria. The results are shown in Table 3.

A: No change in the image is detected at all after rubbing 50 times or more.

B: Reduction in image density is detected after rubbing 50 times, within permissible range for practical use.

C: Obvious reduction in image density is detected for rubbing less than 50 times, with poor quality for practical use.

(Evaluation of Unevenness in Image Density)

The 5-cm by 5-cm solid image printed on coated paper A for printing (OK TOP COAT, weight of paper in gram per square meter: 128 g/m$^2$, manufactured by Oji Paper Co., Ltd.) as a recording medium by the method as described above was visually evaluated. The unevenness in image density was evaluated according to the following evaluation criteria. The results are shown in Table 3.

A: No unevenness in density in the image is detected when the image is observed at a position 15 cm apart from the image.

B: Unevenness in density in a part of the image is detected when the image is observed at a position 15 cm apart from the image, while no unevenness in image density is detected when the image is observed at a position 30 cm apart from the image.

C: Unevenness in density in the image is detected by when the image is observed at a position 30 cm apart from the image.

(Bending Resistance)

A 5 cm by 5 cm solid image was printed on coated paper for printing A (OK TOP COAT, weight of paper in gram per square meter: 128 g/m$^2$, manufactured by Oji Paper Co., Ltd.) as a recording medium by the method as described above. The 100% printed part of the tenth sheet of paper was left standing in an environment at 25° C. and 60% RH for 24 hours. The printed part was bent into two. The bending resistance was evaluated according to the following criteria. The results are shown in Table 3.

A: An image film is not torn.

B: An image film has a slight crack at the bent part.

C: An image film is torn at the bent part.

[Evaluation of Ejection Stability]

Using an inkjet recording apparatus equipped with each ink, the ink was ejected from inkjet heads. The presence of absence of nozzle missing and ejection bending was confirmed by visual observation. According to the following criteria, the ejection stability was evaluated. The results are shown in Table 3.

A: No missing nozzles were observed.

B: Of the whole 512 nozzles, 1 to 4 missing nozzles were detected.

C: Of the whole 512 nozzles, 5 or more missing nozzles were detected.

TABLE 3

| | Ink Number | Recording medium temperature (° C.) in curing | Saturation solubility (wt %) at curing temperature | Blooming | Unevenness in image density | Ejection stability | Rubfastness | Bending resistance |
|---|---|---|---|---|---|---|---|---|
| Example 1 | A | 20 | 0.2 | A | A | A | A | A |
| Comparative Example 1 | | 40 | 0.7 | C | A | A | A | A |
| Comparative Example 2 | | 50 | 2 | C | B | A | B | A |
| Example 2 | B | 10 | 0.4 | B | A | A | A | A |
| Comparative Example 3 | | 40 | 1.2 | C | B | A | A | A |
| Example 3 | C | 40 | 0.01 | A | A | A | A | A |
| Example 4 | | 50 | 0.1 | A | A | A | A | A |
| Comparative Example 4 | | 60 | 0.7 | C | A | A | A | A |
| Example 5 | D | 40 | 0.01 | A | A | A | A | A |
| Comparative Example 5 | | 55 | 1 | C | B | A | A | A |
| Example 6 | E | 25 | 0.01 | A | A | A | A | A |

TABLE 3-continued

| | Ink Number | Recording medium temperature (° C.) in curing | Saturation solubility (wt %) at curing temperature | Blooming | Unevenness in image density | Ejection stability | Rubfastness | Bending resistance |
|---|---|---|---|---|---|---|---|---|
| Comparative Example 6 | | 60 | 0.6 | C | B | A | A | A |
| Example 7 | F | 30 | 0.05 | A | A | A | A | B |
| Comparative Example 7 | | 50 | 1.5 | C | A | A | A | B |
| Example 8 | G | 30 | 0.4 | B | A | A | A | A |
| Comparative Example 8 | | 50 | 1 | C | A | A | A | A |
| Example 9 | H | 30 | 0.01 | A | A | A | A | A |
| Example 10 | I | 30 | 0.01 | A | A | A | A | A |
| Comparative Example 10 | | 50 | 0.7 | C | A | A | A | A |
| Example 11 | J | 25 | 0.01 | A | B | A | B | A |
| Comparative Example 11 | | 60 | 0.6 | C | C | A | B | A |
| Example 12 | K | 30 | 0.4 | B | A | B | B | A |
| Comparative Example 12 | | 50 | 1 | C | A | B | B | A |
| Comparative Example 13 | L | 25 | — | A | C | A | C | A |
| Comparative Example 14 | | 40 | — | A | C | A | C | A |
| Comparative Example 15 | M | 20 | 0.2 | A | C | A | C | A |
| Comparative Example 16 | | 40 | 0.7 | A | C | A | C | A |
| Comparative Example 17 | N | 30 | 0.01 | A | A | A | A | C |
| Comparative Example 18 | | 60 | 0.7 | C | A | A | A | C |
| Comparative Example 19 | O | 30 | 0.01 | A | A | A | A | A |
| Comparative Example 20 | | 60 | 0.6 | C | A | A | A | A |
| Example 13 | P | 30 | — | — | — | — | — | — |
| Comparative Example 22 | | 60 | — | — | — | — | — | — |

As shown in Table 3, when ink was irradiated with actinic radiation (cured) at a temperature with a saturation solubility of wax in the ink of 0.5 wt % or less, blooming was less likely to occur in the image (Examples 1 to 12). The inks in the Examples had a low saturation solubility of wax. This is deduced from the fact that wax was already crystallized when irradiated with actinic radiation, so that wax hardly precipitated after curing.

Ink L having no added wax (Comparative Example 13 and Comparative Example 14), or ink M having an extremely small amount of wax (Comparative Examples 15 and 16) had unevenness in image density, though having no occurrence of blooming. The reason is that the ink had poor pinning properties, causing combining of ink. Furthermore, adding no wax or only a small amount of wax resulted in low rubfastness.

Ink P having no added (meth)acrylate compound A (Example 13 and Comparative Example 22) had no ability to form an image, so that no image evaluation was made. Ink N having excessively added (meth)acrylate compound A (Comparative Examples 17 and 18) had low bending resistance of the cured film.

The present application claims the priority based on a prior Japanese patent application filed by the same applicant, that is, Japanese Patent Application No. 2012-086485 filed on Apr. 5, 2012, the contents of which are incorporated herein by reference in its entirety.

INDUSTRIAL APPLICABILITY

The image forming method of the present invention is less likely to cause blooming on the image to be formed and thus produces high-quality images. The present invention is suitably applied to a various printed matter.

REFERENCE SIGNS LIST 10, 20 Inkjet recording apparatus
12 Recording medium
14, 24 Ejecting recording head
16, 26 Head carriage
18, 28 Actinic radiation section
19 Temperature control section
27 Guide section

The invention claimed is:

1. An image forming method being an inkjet recording method comprising:
    ejecting to a recording medium an actinic radiation-curable inkjet ink including a photopolymerizable compound, a wax, a photopolymerization initiator, and a colorant, the actinic radiation-curable inkjet ink configured to undergo temperature-induced reversible sol-gel phase transition; and
    curing the ink ejected to the recording medium with actinic radiation, wherein the photopolymerizable compound includes a (meth)acrylate compound B having a molecular weight in a range from 300 to 1,500 and having a ClogP value in a range from 4.0 to 7.0;

the wax is contained in an amount of 1.0 to 10 wt % relative to a total weight of the ink; and a temperature of the recording medium during application of the actinic radiation is set at a temperature such that the wax has a saturation solubility in the ink of 0.5 wt % or less.

2. The image forming method according to claim 1, wherein the photopolymerizable compound further includes a (meth)acrylate compound A having a molecular weight in a range from 300 to 1,500 and having 3 or more and less than 14 structural units represented by ($-CH_2-CH_2-O-$) in the molecule; and the (meth)acrylate compound A is contained in an amount of 30 to 70 wt %, and the (meth)acrylate compound B is contained in an amount of 10 to 40 wt.

3. The image forming method according to claim 1, wherein the (meth)acrylate compound B is at least one compound of the following (1) and (2):

(1) a trifunctional or higher-functional (meth)acrylate compound having 3 or more and less than 14 structural units represented by ($-C(CH_3)H-CH_2-O-$) in a molecule thereof, and (2) a bifunctional or higher-functional (meth)acrylate compound having a cyclic structure in a molecule thereof.

4. The image forming method according to claim 1, wherein the temperature of the recording medium during application of the actinic radiation is set at a temperature such that the wax has a saturation solubility in the ink of 0.1 wt % or less.

5. The image forming method according to claim 1, wherein the actinic radiation-curable inkjet ink contains the wax in an amount of 1.5 wt % or more and less than 7 wt %.

6. The image forming method according to claim 1, wherein the wax has a melting point of 30° C. or higher and lower than 150° C.

7. The image forming method according to claim 1, wherein the wax is at least one selected from the group consisting of an aliphatic ketone, an aliphatic monoester, a higher fatty acid, a higher alcohol, and an amide wax.

8. The image forming method according to claim 1, wherein the wax has a ClogP value of 10 or higher.

* * * * *